United States Patent [19]
Ames

[11] Patent Number: 5,394,493
[45] Date of Patent: Feb. 28, 1995

[54] FIBER-OPTIC BUNDLE AND COLLIMATOR ASSEMBLY

[75] Inventor: Gregory H. Ames, Gales Ferry, Conn.

[73] Assignee: The United States of America as represented by the Secretary of the Navy, Washington, D.C.

[21] Appl. No.: 287,029

[22] Filed: Aug. 8, 1994

[51] Int. Cl.⁶ .................................................. G02B 6/26
[52] U.S. Cl. ........................................ 385/35; 385/78
[58] Field of Search .............. 385/74, 78, 35, 900, 385/64, 82, 54

[56] References Cited

FOREIGN PATENT DOCUMENTS

| 53-129057 | 11/1978 | Japan | .................... | 385/59 |
| 59-224807 | 12/1984 | Japan | .................... | 385/74 |
| 62-42108  | 2/1987  | Japan | .................... | 385/74 |

*Primary Examiner*—Rodney B. Bovernick
*Assistant Examiner*—John Ngo

*Attorney, Agent, or Firm*—Michael J. McGowan; Prithvi C. Lall; Michael F. Oglo

[57] ABSTRACT

There is presented a fiber-optic bundle and collimator assembly comprising a plurality of bodies of cylindrical configuration and of equal diameter arranged side by side in a hexagonal close-packed configuration, a retainer for retaining the bodies in the close-packed configuration, and a potting material for locking the bodies in position. A plurality of the bodies and fiber-optic ferrules have therein a single optical fiber. A remainder of the bodies are non-optical fiber bearing ferrules in alignment width-wise of the assembly to form a collimator assembly face. The fiber-optic ferrules are each recessed from the assembly face to form a pocket. A spacer is disposed in each pocket and abuts a fiber-optic ferrule, and a spherical lens is disposed in each pocket and abuts a spacer. Each of the lenses is of the same diameter as its associated fiber-optic ferrule, and has its axis in alignment with the axis of the associated fiber-optic ferrule optical fiber.

5 Claims, 1 Drawing Sheet

FIBER-OPTIC BUNDLE AND COLLIMATOR ASSEMBLY

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED PATENT APPLICATIONS

This patent application is co-pending with two related patent applications entitled Multi-Channel Fiber-Optic Rotary Joint With Bundle Collimator Assemblies (Navy Case 76172), and Assembly Method For Fiber-Optic Bundle Collimator Assemblies (Navy Case 76191).

BACKGROUND OF THE INVENTION

1. Field of the Invention

This invention relates to transmission of fiber-optic signals and is directed more particularly to a collimator for transforming the output from a plurality of optical fibers into precisely parallel optical beams.

2. Description of the Prior Act

Many fiber-optic devices require that the output from a number of optical fibers be converted into collimated beams. Coupling of two such fibers is referred to as "expanded beam coupling," which requires high precision alignment of the respective fibers. When a number of beams of such fibers must be collimated, it is necessary that the beams be individually collimated, a time consuming and complicated process.

It would be beneficial in many applications if a plurality of separate optical fibers could be precisely aligned and adapted for simultaneous collimation of all the plurality of optical beams and for simultaneous beam coupling.

SUMMARY OF THE INVENTION

An object of the invention is, therefore, to provide a fiber-optic bundle and collimator assembly in which in the bundle there are a plurality of precisely parallel fiber-optic ferrules positioned in a precise azimuthal position and in which in the collimator are a plurality of lenses for collimating the beams emitted from the ferrules.

With the above and the objects in view, as well hereinafter appear, a feature of the present invention is the provision of a fiber-optic bundle and collimator assembly comprising a plurality of bodies of substantially cylindrical configuration and of equal diameter arranged side by side in a hexagonal fashion, a retainer for retaining the bodies in the hexagonal configuration, and potting material in the retainer for locking the bodies in position. A plurality of the bodies are fiber-optic ferrules, each of the ferrules having therein and extending centrally therethrough a single optical fiber. A remainder of the bodies are non-optical fiber bearing ferrules in alignment width-wise of the assembly to form a collimator assembly face. The fiber-optic ferrules are each recessed from the assembly face by an equal distance to form a pocket in the assembly face. A spacer is disposed in each of the pockets and abuts one of the fiber-optic ferrules, and a spherical optical lens is disposed in each of the pockets and abuts one of the spacers. Each of the lenses is of the same diameter as its associated fiber-optic ferrule and its axis is aligned with the axis of the associated fiber-optic ferrule optical fiber.

The above and other features of the invention, including various novel details of construction and combination of parts, will now be more particularly described with reference to the accompanying drawings and pointed out in the claims. It will be understood that the particular device embodying the invention is shown by way of illustration only and not as a limitation of the invention. The principles and features of the invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENT

Figure 2:
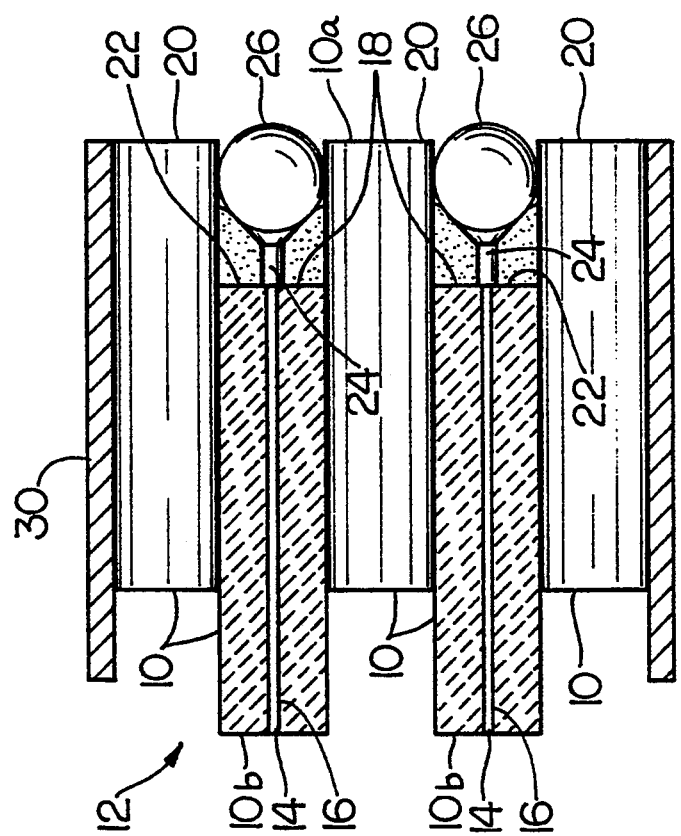
FIG. 2 is a sectional view of the assembly of FIG. 1, taken along line II—II of FIG. 1, with spacer members and lenses shown in elevation.
Figure 1:
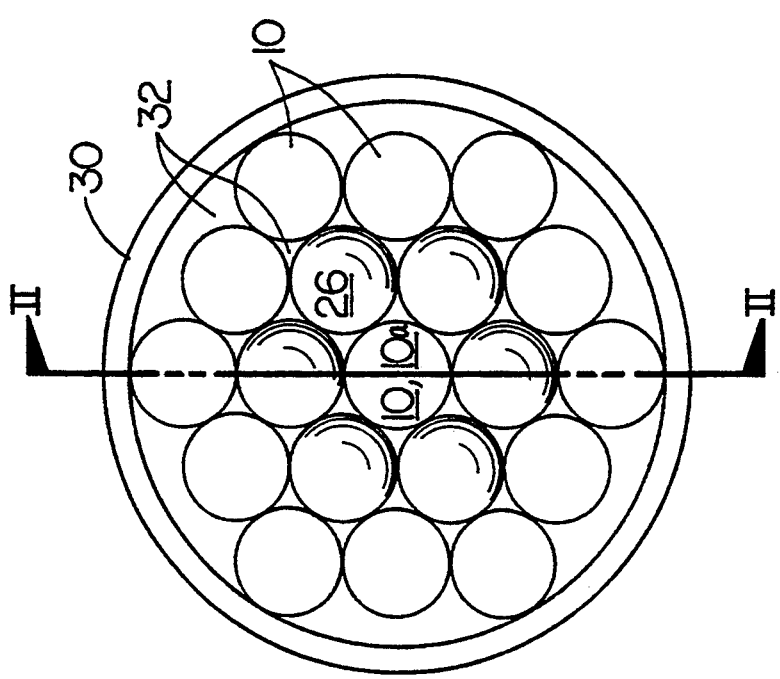
FIG. 1 is an end view of a fiber-optic bundle and collimator assembly, illustrative of an embodiment of the invention.

Referring to the drawings, it will be seen that the illustrative assembly includes a plurality of ferrules 10 of a type well known and widely used for single optical fibers. Such ferrules 10 are high precision cylindrical ferrules readily available at low cost.

Such ferrules of equal diameter may be assembled side by side in appropriate bundles and, by application of force radially inwardly, compressed into a hexagonally close-packed bundle with the ferrule tubes arranged in predictable azimuthal positions. By application of a potting material, and/or retention by the radially directed force means, typically a split ring or a shrink film, or the like, the ferrules are locked in position in the bundle.

In the embodiment of the invention illustrated in the drawings, nineteen ferrules 10 are arranged in a bundle 12, including a central ferrule 10a and two concentric hexagonal rings of ferrules. The inner ring of six ferrules 10b contain optical fibers 14 which are potted into their respective tubes 16. The faces 18 of the fiber-optic ferrules 10b are polished, as disclosed in the afore-mentioned co-pending Navy Case 75356.

The ferrules 10b of the inner ring are recessed from an assembly face 20, providing pockets 22 of equal depth in the face 20. Spacers 24 and spherical optical lenses 26 are disposed in the pockets 22. The spherical lenses 26 are of glass or other optically transparent material and are fabricated with small diameter and roundness tolerances. The spherical lenses 26 are provided with precisely the same diameters as the ferrules 10.

The spacers 24 establish an appropriate separation between the ferrule faces 18 and the lenses 26. The separation between the optical fiber 14, and the lens 26 is critical to providing a correctly collimated beam at the output of the lens 26. In coupling a single-mode optical fiber to another single-mode optical fiber, it is known that there is an optimum separation of optical fiber face and spherical lens which results in the lowest optical coupling loss. The arrangement of ferrules 10, lenses 26, and spacers 24 is maintained, in the embodiment illustrated, by an outer ring 30 and a potting material 32, typically an epoxy.

As noted hereinabove, the ferrules 10 establish a close-packed hexagonal array which, because of the accuracy of the ferrule diameters, affords precise location for each ferrule. Inasmuch as the spherical lenses 26 are of precisely the same diameters as the ferrules 10, the center of each lens 26 is on the same line as the axis of the associated recessed ferrule. Angular deflection of the beam which exits the lens, relative to the ferrule axis, is caused by lateral displacement of the lens center relative to the optical fiber center. Because of the precise alignment of lens 26 and optical fiber 14 in the inventive assembly, a collimated beam emerges precisely parallel to the ferrule axis. Because all of the ferrules in the hexagonal array are parallel, all emerging collimated beams are co-parallel.

There is thus provided a single assembly providing multiple collimated beams which are parallel. In aligning the assembly with a complementary second assembly of like construction, a single tilt adjuster (not shown) and azimuthal adjustment may be used to adjust one of the ferrule tubes for lowest optical loss. Such alignment results in all the remainder of the fiber-optic ferrule tubes also exhibiting low optical loss. A tilt adjuster of the type suitable for the assembly herein is disclosed in Navy Case 76172, filed concurrently herewith.

It is to be understood that the present invention is by no means limited to the particular construction herein disclosed and/or shown in the drawings, but also comprises any modifications or equivalents within the scope of the claims.

What is claimed is:

1. A fiber-optic bundle and collimator assembly comprising:
   a plurality of bodies of substantially cylindrical configuration and of equal diameter arranged side by side in a hexagonal close-packed fashion;
   a retainer for retaining said bodies in said close-packed configuration;
   potting material in said retainer for locking said bodies in position;
   a plurality of said bodies being fiber-optic ferrules, each of said ferrules having therein and extending centrally therethrough a single optical fiber;
   a remainder of said bodies being non optical fiber bearing ferrules in alignment width-wise of said assembly to form a collimator assembly face;
   said fiber-optic ferrules being each recessed from said assembly face by an equal distance each to form a pocket in said assembly face;
   a spacer in each of said pockets and abutting one of said fiber-optic ferrules; and
   a spherical optical lens in each of said pockets and abutting one of said spacers, each of said lenses being of the same diameter as its associated fiber-optic ferrule and having its axis aligned with the axis of said associated fiber-optic ferrule optical fiber.

2. The assembly in accordance with claim 1 wherein said retainer is a sleeve surrounding said bodies.

3. The assembly in accordance with claim 1 wherein said bodies include a central non optical fiber bearing ferrule surrounded by a ring of fiber-optic ferrules.

4. The assembly in accordance with claim 3 wherein said bodies further include a ring of non optical fiber bearing ferrules surrounding said ring of fiber-optic ferrules.

5. The assembly in accordance with claim 4 wherein said ring of fiber-optic ferrules includes six ferrules and said ring of non optical fiber bearing ferrules includes twelve ferrules.

* * * * *